United States Patent [19]

Kalmanash

[11] Patent Number: 5,486,935
[45] Date of Patent: Jan. 23, 1996

[54] HIGH EFFICIENCY CHIRAL NEMATIC LIQUID CRYSTAL REAR POLARIZER FOR LIQUID CRYSTAL DISPLAYS HAVING A NOTCH POLARIZATION BANDWIDTH OF 100 NM TO 250 NM

[75] Inventor: Michael H. Kalmanash, Los Altos, Calif.

[73] Assignee: Kaiser Aerospace and Electronics Corporation, Foster City, Calif.

[21] Appl. No.: 84,634

[22] Filed: Jun. 29, 1993

[51] Int. Cl.$^6$ .............................. G02F 1/13; G02F 1/1335
[52] U.S. Cl. .................. 359/37; 359/49; 359/65; 359/105
[58] Field of Search .................. 359/37, 101, 105, 359/106, 49, 63, 102, 65, 48

[56] References Cited

U.S. PATENT DOCUMENTS

| | | | |
|---|---|---|---|
| 4,315,258 | 2/1982 | McKnight et al. | 359/63 |
| 4,818,076 | 4/1989 | Heppke et al. | 359/65 |
| 5,235,443 | 8/1993 | Barnik et al. | 359/37 |
| 5,319,478 | 6/1994 | Fünfschilling et al. | 359/65 |

OTHER PUBLICATIONS

Wu et al., "Optical and electro-optic properties of cyanotolanes and cyanostilbenes: Potential infrared liquid crystals", Journal of Applied Physics, vol. 64, No. 2, 15 Jul. 1988, pp. 821–826.

*Primary Examiner*—William L. Sikes
*Assistant Examiner*—Walter J. Malinowski
*Attorney, Agent, or Firm*—Marvin H. Kleinberg; Marshall A. Lerner; Michael J. Ram

[57] ABSTRACT

The efficiency of LC displays is improved by the use of a polymeric chiral nematic liquid crystal rear polarizer and reflective backlight housing which increases the net transmission of light and, at the same time, reduces the weight of the assemblage and increases battery life by utilizing lower levels of illumination. The polymeric chiral nematic liquid crystal can be a freestanding film or films, or can be supported by a single glass substrate. The liquid crystal polarizer can have a bandwidth sufficient to transmit electromagnetic radiation across the entire visible spectrum.

14 Claims, 6 Drawing Sheets

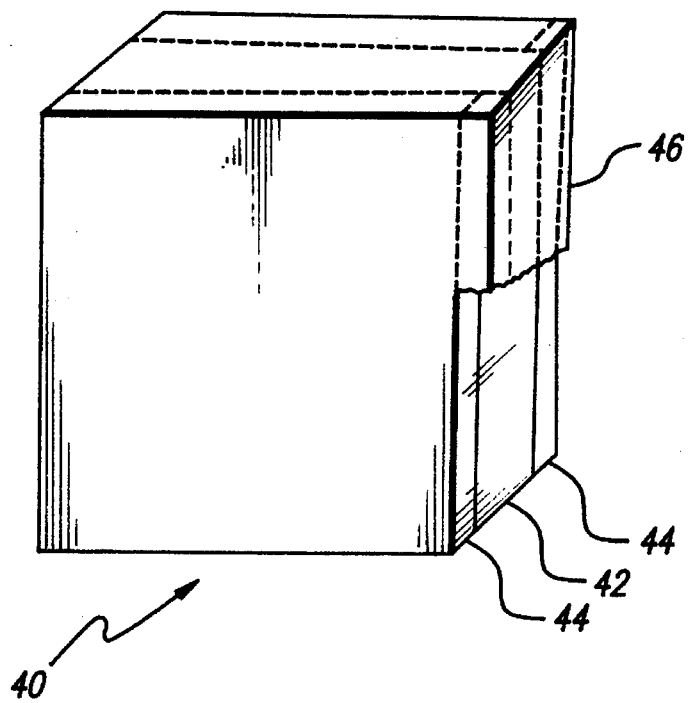
FIG. 5
PRIOR ART
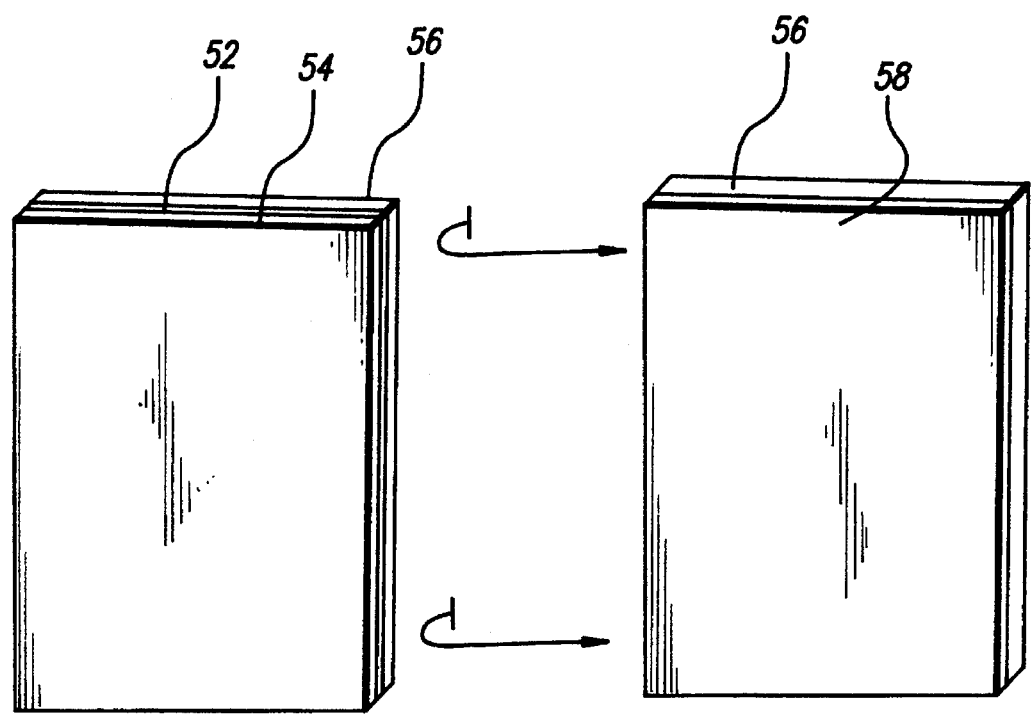
FIG. 6A
FIG. 6B

HIGH EFFICIENCY CHIRAL NEMATIC LIQUID CRYSTAL REAR POLARIZER FOR LIQUID CRYSTAL DISPLAYS HAVING A NOTCH POLARIZATION BANDWIDTH OF 100 NM TO 250 NM

FIELD OF THE INVENTION

The present invention relates to display devices and, more particularly, to high efficiency polarizers in applications such as active matrix liquid crystal (LC) displays.

BACKGROUND OF THE INVENTION

In the prior art, the brightness of a liquid crystal display (such as a computer terminal screen) has been adversely affected by absorptive elements in the optical path. For example, the front and rear polarizers in a conventional twisted nematic liquid crystal display assembly can absorb more than two thirds (⅔) of the overall luminance emitted by the backlight. Display brightness can be enhanced by ensuring that more light is transmitted, either by increasing the backlight intensity or reducing the amount of light lost in the absorptive elements.

Increasing the backlight intensity has the major drawbacks of higher power dissipation (leading to shortened battery life for portable equipment) and shortened backlight bulb life. Although power dissipation and battery size and life are ever present challenges, the prior art fails to consider a closer examination of the absorptive elements in backlit "direct view" liquid crystal display applications, i.e. computer screens or televisions, with the goal of reducing the absorption. Conventional polarizers are made from stretched polyvinyl alcohol films containing iodine (or a dye if color is desired) between layers of cellulose acetate, attached to a glass surface with an acrylic adhesive and covered by a layer of plastic. Transmission does not exceed 40%, efficiency is lost over time, and polarizers are an expensive component in the manufacture of LCDs. According to the present invention, in a direct view application (such as a computer or television screen), the conventional rear polarizers are replaced with a high efficiency, non-absorptive chiral nematic liquid crystal polarizer whose transmissiveness is substantially greater than the absorptive polarizers of the prior art.

A. Liquid Crystal (LC) Polarizers

The concept of liquid crystal devices (LCDs) as display elements is familiar. The effect of electrical current through an LC display element backlit with polarized light produces the well-known "black line segments" which are featured in everything from digital watch displays to laptop computer screen text. By contrast, the application of a liquid crystal as a polarizer is not at all familiar or common. Before discussing the scant prior art which discusses liquid crystal polarizers, an overview of the characteristics of cholesteric liquid crystals (CLCs) is necessary to provide a basis for illustrating the present invention.

B. Cholesteric Liquid Crystal (CLC) Polarizers

Cholesteric liquid crystals (CLCs) are a class of liquid crystals exhibiting unique optical properties. Cholesteric liquid crystals were originally so named because the substances in which the pattern of molecular ordering was observed were related to cholesterol, hence "cholesteric". The more descriptive terminology for this class of liquid crystal is "chiral nematic". "Chiral", meaning "twisted", and "nematic", meaning "thread", succinctly express the gross appearance of the molecular orientations: like twisted threads. Popular and technical literature still frequently refer to the class by its early name. For the purposes of this discussion, however, the terms "cholesteric" or "chiral nematic" liquid crystal or "CLC" or "CNLC" will be used interchangeably, with the intention that each term be understood to include the entire class of chiral nematic liquid crystals.

The distinct helical molecular ordering imparts CLCs with several notable optical properties. First, CLCs are virtually non-absorptive. Light hitting a CLC is either transmitted or reflected. Second, CLCs exhibit circular dichroism for certain wavelengths of light. By way of explanation, consider the concept of polarization. While it is familiar to most to consider light as being either horizontally or vertically (linearly) polarized, it is useful and viable to alternatively conceptualize light as composed of two possible circular polarizations—right and left. Light can thus be conceived of as composed of righthanded and lefthanded circular polarizations. A chiral nematic liquid crystal allows wavelengths of light that are significantly longer or shorter than the mean refractive index of the liquid crystal multiplied by its pitch (the distance in which the liquid crystal molecular helical structure completes one complete twist) to simply pass through the liquid crystal. For wavelengths of light that are at or near the product of refractive index and the pitch, however, the interaction of the chiral nematic liquid crystal structure and the light's circular polarization is much like twisting a nut onto a screw. Light of the same polarization sense or handedness passes easily, like a right handed nut easily screws onto a right handed screw. However, light of the opposite polarization is reflected. This phenomenon of "selective reflection" as well as the characteristic non-absorption accounts for the virtual fifty percent transmission of incident light with a wavelength equal to the CLC pitch multiplied by the material refractive index.

This effectively optimal percentage of transmitted circularly polarized light is a vast improvement to the ultimate brightness of the active matrix liquid crystal display since it is only polarized light which eventually contributes to the screen images displayed to the viewer.

The band of light wavelengths subject to circular dichroism is a characteristic of the material used in the CLC polarizer, and is referred to as the device's "notch" or "notch bandwidth". Light wavelengths within the "notch" region will be circularly polarized by the CLC device and either transmitted or reflected. Light outside the "notch" is transmitted by the CLC. Only light in the "notch" region contributes to the display that is seen by the viewer of a direct view device, and therefore it is important that the "notch" region be broad enough to cover the full spectral range of the LCD backlight.

In short, the instant invention effectively eliminates the absorption problem heretofore inherent in conventional polarizers since the CLC does not absorb any appreciable amount of light. On an initial pass, nearly 50% of light in the notch bandwidth is circularly polarized on passing through the CLC polarizer, passes through a quarter wave plate where it becomes linearly polarized, and, ultimately, "feeds" the display.

C. Notch, Bandwidth and Birefringence

As it is apparent from the above discussion, the notch bandwidth of a CLC determines how broad a band of light wavelengths the CLCs will polarize. The notch or notch central wavelength ($\lambda_o$) is related to the device properties by the equation $$\lambda_o = n \times p \times \cos\Theta \tag{1}$$

where "n" is the average refractive index of the liquid crystal material, "p" is the helical pitch of the chiral nematic material, and "e" is the angle of the incident light. For normally incident light, the equation reduces to $$\lambda_o = n \times p \quad (2)$$

The notch central wavelength ($\lambda_o$) is directly related to the liquid crystal's pitch (p).

The polarization (notch) bandwidth can be approximately expressed as $$\Delta\lambda = \Delta n \times p \quad (3)$$

where "$\Delta n$" is the birefringence of the material. From this equation it can be seen that polarization bandwidth ($\Delta\lambda$) is directly related to material birefringence ($\Delta n$). Chiral nematic liquid crystal materials can be designed for high birefringence ($\Delta n$) and correspondingly broad bandwidth ($\Delta\lambda$). Since the CLC device is highly transmissive outside its "notch", multiple CLC devices (with different $\lambda_o$'s) can be stacked to provide a broadband polarizer. However, a single broad notch bandwidth reduces the number of discrete components needed for broadband optical systems. The invention herein teaches a liquid crystal film or films of sufficiently broad bandwidth so as to polarize and transmit light of the entire visible spectrum (450 nm to 650 nm). As discussed below, it is the polymer chiral nematic liquid crystal which exhibits the optical and physical properties necessary for the invention taught herein.

1. Chiral Nematic LCs: Monomers Versus Polymers

Monomer CLCs used in a variety of applications differ markedly from a polymer chiral nematic LC used as a polarizer, largely due to the differences arising from monomer versus polymer structure.

Monomer LCs are made up of short, single chain molecules. Polymer LCs are made up of long chain molecules consisting of a sequence of repeating monomers which are connected by chemical bonds. In the polymers of the invention, the properties are derived from monomer LCs attached to a polymer backbone.

The polymer's physical and optical properties are quite different from those of the ubiquitous monomer. Because the optical properties of monomer LCs are typically defined in narrow spectral ranges, monomers are brilliant (due to the high transmissiveness/low absorption) but monochromatic (due to the narrow notch bandwidth). Polymer chiral nematic LCs can be designed with broad optical properties— making them more achromatic and, therefore, adaptable to full color displays. So too, monomers are typically extremely temperature sensitive and the related optical properties are temperature dependent (hence the popular use in thermometers). Polymer liquid crystals, however, have excellent thermal stability over a wide range of temperatures. Moreover, polymers also demonstrate environmental durability owing to a "frozen" mesophase at temperatures below 150 degrees C. Polymer chiral nematic liquid crystals also exhibit stable optical properties over a wide temperature range.

Another major difference between monomers and polymers is that, owing to the different physical properties, polymer chiral nematic liquid crystals can be fabricated as free-standing films or can be spread on a single glass substrate layer. Monomers, on the other hand, are found only in a relatively low viscosity (liquid) state, and therefore must be confined in a glass "cell", in which two sheets of glass contain the liquid crystal. The cell is sealed around the entire perimeter to keep the liquid crystal from leaking out.

A free-standing polymer chiral nematic liquid crystal film (which may be imagined as a plastic-like sheet) is dramatically lighter than the conventional double glass cell required for monomer liquid crystals. Alternatively, and in the interests of greater durability, a single glass substrate can be used to support a thin polymer chiral nematic liquid crystal film. As the present invention teaches, even the use of a single glass substrate can achieve a significant weight savings over either a conventional or monomeric polarizer.

2. Monomer Projection Polarizers

While polymer chiral nematic liquid crystals ("CNLC") are discussed in the literature, they have not been associated with display applications. Recent literature discusses application of monomer chiral nematic liquid crystal devices in a projection system such as might be suitable for high definition television. (Schadt, Martin and Fünfschilling, Jurg, "Novel Polarized Liquid-Crystal Color Projection and New TN-LCD Operating Modes" SID 90 DIGEST p 324-6). Schadt and Fünfschilling describe a system which uses three narrow bandwidth monomer LC polarizers tuned to red, green, and blue, respectively, to generate the projection display colors from the white display backlight. Id.

The current invention deals not with projection, but with a direct view device, and employs a polarizer composed of broadband polymer chiral nematic liquid crystal devices, as opposed to monomer liquid crystals.

Hence, the invention herein disclosed is remarkably different from any device to date. Monomer liquid crystal devices typically have narrow polarization (notch) bandwidths (usually less than 20 nm). The system described by Schadt (supra) uses three narrow bandwidth chiral nematic liquid crystal polarizers, tuned to red, green and blue, to generate the projection display colors from the white display backlight.

The invention herein discloses a device utilizing one or more polymer liquid crystal films, each of which has a broad bandwidth and, consequently, properly arranged, can create a film which transmits the entire visible spectrum (450nm to 650nm).

Moreover, the disclosed direct view application differs significantly from the prior art projection devices. The projection device used by Schadt was, arguably, suitable for viewing because the light through the monomer chiral nematic liquid crystal polarizer is collimated (i.e. in parallel beams). This had the practical effect of producing a projected image which appeared fairly stable to the viewer.

A monomer liquid crystal is unacceptable as a rear polarizer for a direct view display, such as a computer terminal. Because the polarization "notch" is a function of viewing angle, in a narrowband monomer LC polarizer for direct view, the polarizer notch(es) would appear to shift at the slightest position change of the viewer and, consequently, the polarization efficiency at the wavelength emitted by the backlight would suffer and the contrast of the computer screen would be markedly reduced, depending upon the viewer's position. Two persons watching the same computer game, for instance, would each see different image quality since they each experience different viewing angles. This so limits the usefulness of a direct view color display that monomers are not candidates for polarizers in a LC direct view display.

The polymer liquid crystal disclosed herein is free of this serious shortcoming because it has a broader bandwidth and produces an achromatic display that does not shift in color as the viewer changes viewing angle. Thus, two persons playing a computer game on an assembly employing the herein disclosed invention would each see similar image quality.

SUMMARY OF THE INVENTION

The current invention concerns the use of broadband polymeric chiral nematic liquid crystal ("CNLC") films as high efficiency polarizers in liquid crystal displays ("LCDs") and similar applications.

A. Polymer Chiral Nematic LC Polarizer

According to the present invention, the conventional rear polarizer of a display device is replaced with a transmissible (i.e. non-absorptive) polymer chiral nematic LC polarizer. The polymer chiral nematic LC polarizer is virtually 100% transmissible and the wavelengths of light in the "notch" bandwidth are transmitted as right or left-handed circularly polarized light. Only one "handedness" of light is transmitted in the notch bandwidth; the non-transmitted light is not absorbed but reflected back to the rear reflector backlight housing without reversal of polarization (e.g. incident left-handed light is reflected as left-handed light). Light reflected onto the backlight housing is re-reflected with a portion undergoing a reversal of polarization (e.g. left to right-handed). Light which has reversed its "handedness" in this manner is then the proper orientation for transmission and passes through the polarizer.

Thus, a portion of the light is then retransmitted through the chiral nematic LC polarizer; light which is not transmitted is re-reflected a second time. The process repeats until a very high percentage of light is eventually transmitted through the CNLC rear polarizer. Despite the multiple reflections light may undergo before it passes through the rear polarizer, very little light is actually absorbed by the chiral nematic LC polarizer, especially as compared with conventional polarizers.

Accordingly, one advantage of the current invention is increased net light transmission, leading to increased brightness and/or reduced power dissipation. For many applications (e.g., portable equipment) additional advantages include increased battery operation time and/or reduced battery weight.

Prior art liquid crystal devices only polarized light within a narrow wavelength band. High birefringence ($\Delta n$), broad polarization bandwidth ($\Delta\lambda$) liquid crystal polymers can be formulated by attaching chiral and nematic liquid crystal monomers to backbones from the methacrylate/acrylate class of polymers. Products of this process can polarize light across a broad spectral region, enabling a single element polymer cholesteric liquid crystal film to function as a wide band polarizer. Practically speaking, this combination of physical and optical properties translates into smaller, lighter, brighter devices (e.g. full color portable televisions or computer screens).

Alternatively, multiple polymer cholesteric liquid crystal films, can each be constructed with a lower birefringence material ($\Delta n$) (narrower polarization bandwidth ($\Delta\lambda$) and then could be layered to produce a finished composite film with broad bandwidth. For example, three separate films, respectively tuned to the red, green and blue spectral regions, can be overlaid to produce a broadband polarizer. This, too, produces a device that is smaller, lighter, and brighter than the prior art.

As with prior art structures, polymer chiral nematic liquid crystal devices can be constructed using two glass substrates with the liquid crystal captured between them. In the process of constructing such an assembly, the substrates are used as forming and aligning elements (the separation distance determining the film thickness), as well as functioning as a support element to the thin polymer cholesteric liquid crystal film in the assembled device. For single substrate device fabrication, the approach includes an initial assembly with two substrates and the liquid crystal between the two, where one substrate is coated with a release film to allow its subsequent disassembly and removal from the liquid crystal. This leaves an assemblage consisting of the single remaining glass substrate and the liquid crystal polymer film.

For multi-film systems, subassemblies could be integrated into a single assembly by bringing a pair of polymer chiral nematic liquid crystals films into juxtaposition, applying pressure, and heating to above the glass transition temperature ($T_g$) to allow the films to adhere. Alternatively, a thin lamination layer (e.g. Ecogel) could be used as a bonding agent between films. One glass substrate pretreated with a release film enables its removal from the adhered films. The process can be repeated for a plurality of layers. Advantages of this combination include greater durability along with reduced weight and bulk.

B. Backlight Modifications

In conjunction with the introduction of a chiral nematic liquid crystal rear polarizer as an element in the otherwise conventional display assembly, modifications to the backlight housing may also increase transmission of light, thereby brightening the resulting display. While the first requirement of a backlight housing is that it be highly reflective, the housing's ability to preserve polarization sense (eg. through the use of a metallic reflector) optimally improves net transmission of the overall system when used with a chiral nematic liquid crystal rear polarizer.

This is explained by considering the fact that light reflected by the chiral nematic liquid crystal polarizer is circularly polarized. When re-reflected from a metallic backlight housing, the light has its sense of polarization reversed (e.g. assuming initially left-hand circular polarization, then the reversal is from left to right-hand circularly polarized). Since the polarizer transmits right-handed polarized light (and reflects left-hand polarized light), the re-reflected light is predominantly right-hand polarized as a result of the reversal and, on a second pass, a larger proportion of the previously rejected light is transmitted by the chiral nematic liquid crystal polarizer than would be the case if the light were randomly polarized. While some slight loss is inherent in each reflective cycle, increasing the light transmission with each cycle enhances the net transmission of the device. The backlight housing reflector also scavenges unpolarized light which is transmitted in the wrong direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows a prior art liquid crystal display cell with two supporting glass plates and a perimeter seal;

FIG. 6, including 6A and 6B, shows in detail a polarizer using a polymeric chiral nematic liquid crystal useful in the present invention;

DETAILED DESCRIPTION OF THE DRAWINGS

Figure 1:
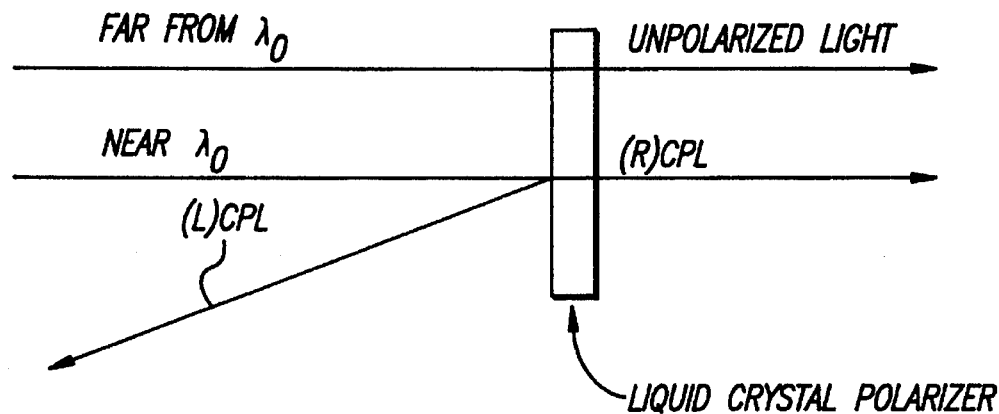
FIG. 1 shows the function of a cholesteric or chiral nematic liquid crystal polarizer.

FIG. 1 illustrates the function of a cholesteric or chiral nematic liquid crystal polarizer. All electromagnetic radiation outside the notch polarization bandwidth is transmitted without absorption and without polarization. Wavelengths in the notch polarization bandwidth are half transmitted as one-handed circularly polarized and half reflected as the opposite handed circularly polarized light. The figure shows transmission of right hand circularly polarized light and reflection of left hand circularly polarized light.

Figure 2A:
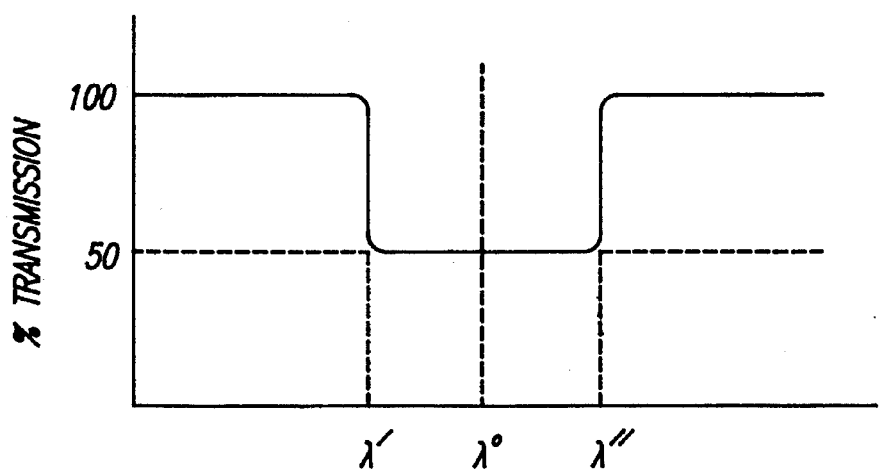
FIG. 2, including 2A and 2B, illustrates the notch bandwidth wavelength being transmitted through a chiral nematic liquid crystal polarizer.
Figure 2B:
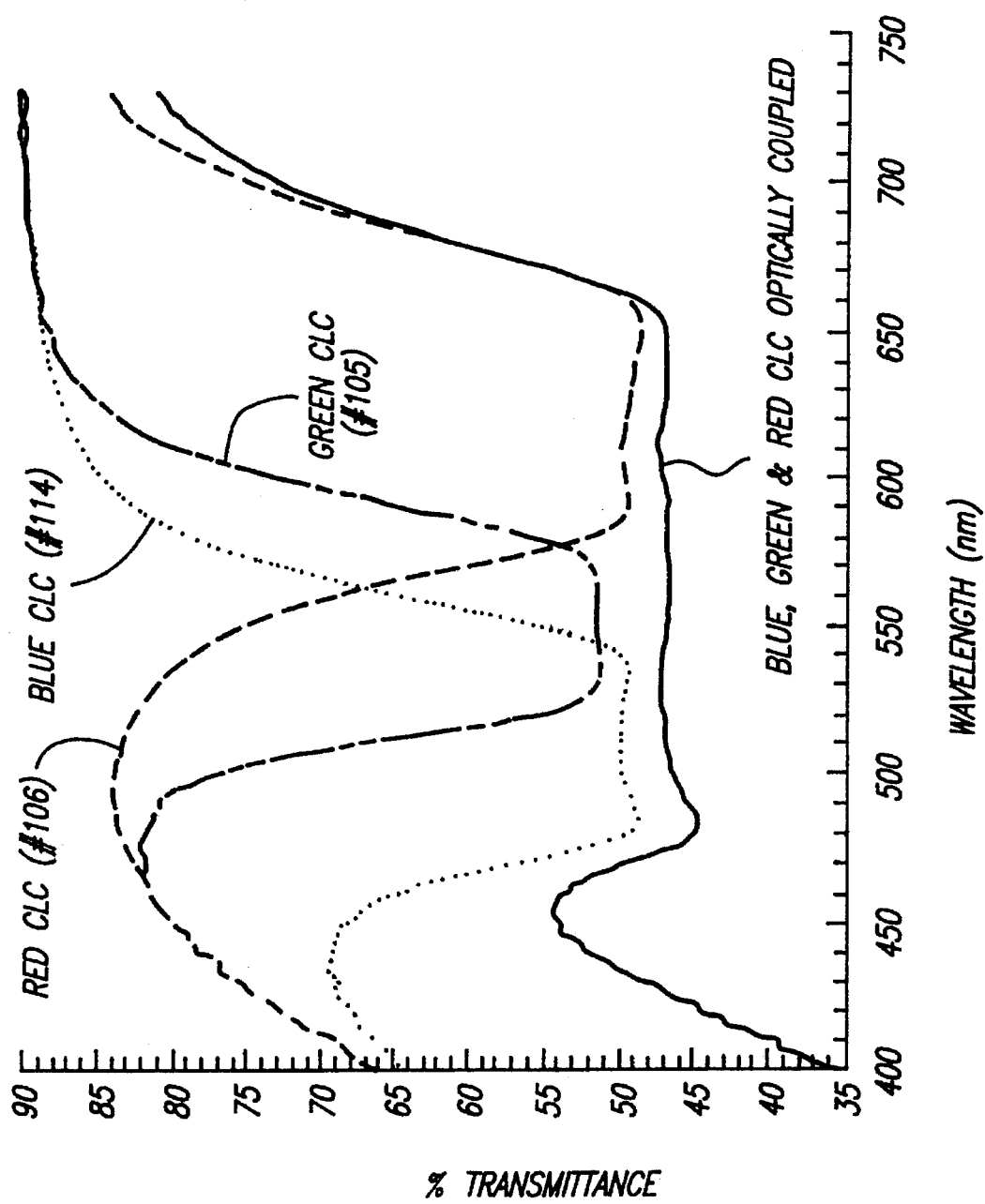

FIG. 2 illustrates the notch polarization bandwidth of a cholesteric liquid crystal as a transmission plot. Light with wavelengths in the notch bandwidth from λ' to λ" can be described as having circularly polarized components in both senses or handednesses. One preferred "handedness" right or left, is transmitted and the other is reflected. FIG. 2B illustrates the composite bandwidth of three polymer cholesteric liquid crystal films with effectively overlapping bandwidths.

Figure 3:
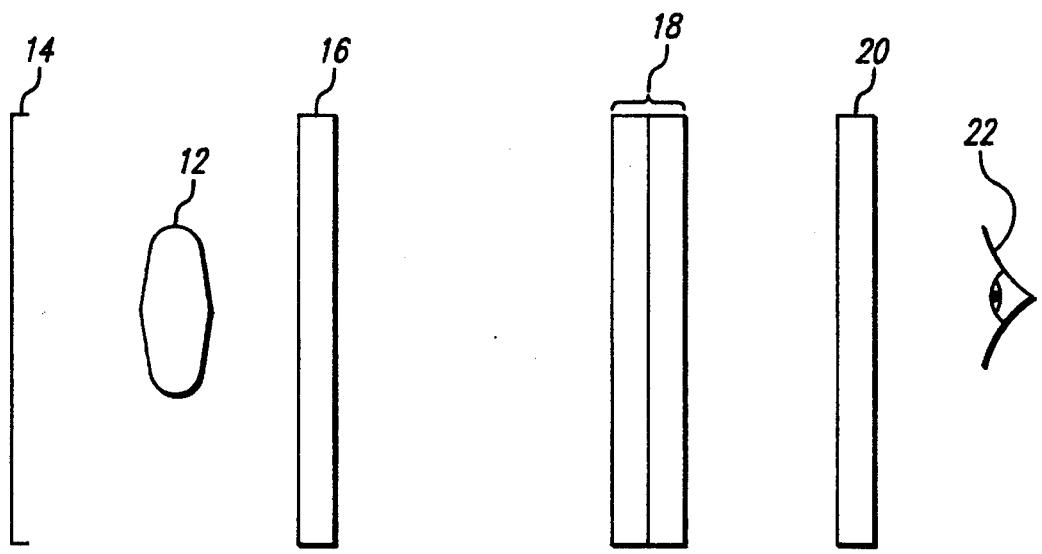
FIG. 3 shows a conventional display assembly according to the prior art.

FIG. 3 depicts a conventional-prior art display assembly 10 which consists of a light source 12, a rear reflector 14; a rear polarizer 16; a liquid crystal display 18; and a front polarizer 20. Light emitted from the source 12 either is absorbed by the rear polarizer 16 or passes directly through the liquid crystal display 18. Thus, only the light that initially passed through the rear polarizer 16 reaches a viewer 22. A significant portion of the light is lost by absorption by the rear polarizer 16.

Consequently, to keep the display screen 18 bright, the light source 12 necessarily must consume more electrical power. In applications such as notebook size computers, this means significantly heavier batteries, shorter battery life, shorter backlight life, and increased weight.

Figure 4A:
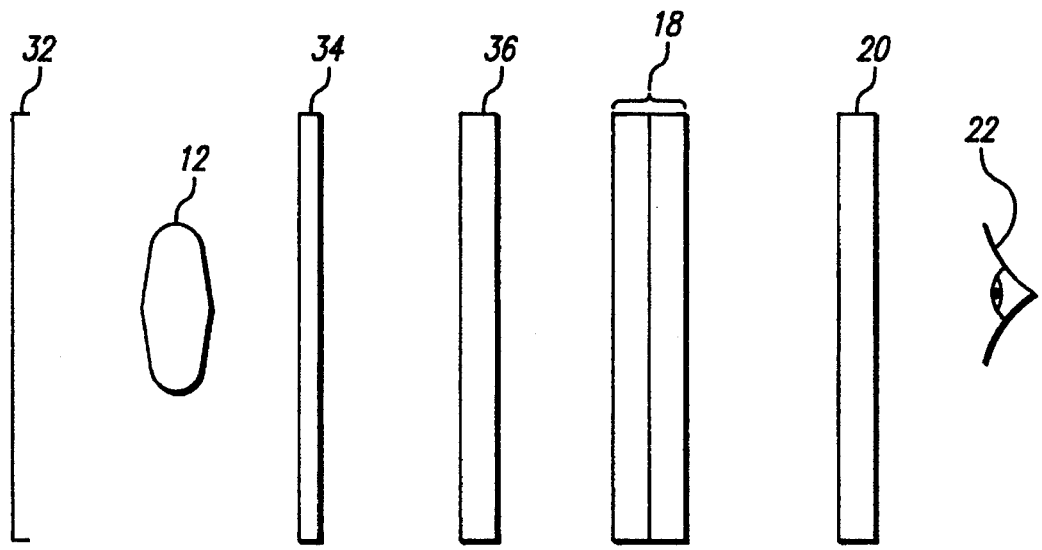
FIG. 4, including 4A and 4B, illustrates a display assembly according to the present invention.

The invention taught herein, as depicted in FIG. 4A, is an assembly 30 of a light source 12 which provides the illumination of the display; a metallic, polarization reversing rear reflector (backlight housing) 32; a rear polarizer 34 composed of a broadband polymer chiral nematic liquid crystal film; a device that converts circularly polarized light to linearly polarized light, such as a quarter wave plate 36; the active (image forming) liquid crystal element 18; and the front polarizer 20. All of the elements are in an alignment normal to the viewing plane with the rearmost component being the metallic reflector 32 and the frontmost, the front polarizer 20.

Light emitted from the source 12 is transmitted in large part by the broadband chiral nematic LC polarizer 34, in the form of highly circularly polarized light, either left or right handed, but not both. Light oppositely polarized to that which is being transmitted is reflected to the backlight housing reflector 32 where it is re-reflected.

Figure 4B:
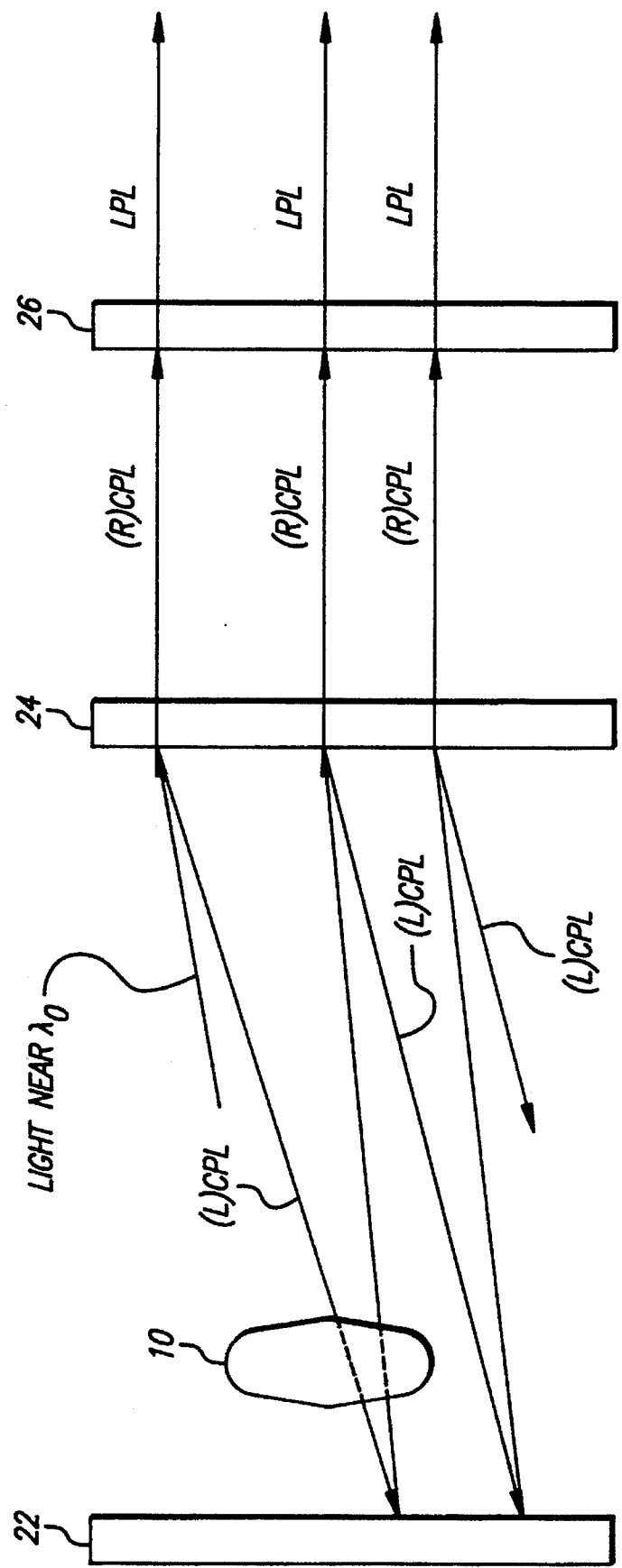

Of the re-reflected light, a portion will pass through the chiral nematic LC rear polarizer 34 as circularly polarized light and the remainder (light which is polarized opposite to that which is transmitted) will be re-reflected again from the reflector 32. As seen in FIG. 4B, this sequence of transmission of some light and re-reflection of the remainder is repeated until a high percentage of the light is eventually transmitted through the chiral nematic LC rear polarizer 34.

After passing through the rear polarizer 34, the transmitted light encounters the quarter wave plate 36 which converts the circularly polarized light to linearly polarized light. The linearly polarized light then passes through the active liquid crystal display (LCD) device 18 and the front polarizer 20 before reaching the viewer 22.

The polarized light is selectively rotated by the LCD (on a pixel-by-pixel basis), under control of an electrical signal, so that it is either in line with, or orthogonal to, the front polarizer transmission axis. Light which is transmitted through the front polarizer 20 is perceived by the viewer as the bright portion of the display. Non-transmitted light is absorbed by the front polarizer and forms the dark portions of the display image. Since the polymeric chiral nematic liquid crystal 34 polarizes and, hence, transmits, light of the entire visible spectrum, the display can be filtered (on a pixel-by-pixel basis) to create full color images.

The material for the chiral nematic liquid crystal rear polarizer 34 should be chosen for high birefringence since high birefringence results in broad bandwidth. Bandwidth is directly related to the visible spectrum: a bandwidth of, for example, 250 nm, with a central notch wavelength in the center of the visible range (i.e. in the neighborhood of 525 nm) is sufficient to transmit light of the entire visible spectrum.

Materials which form polymer chiral nematic liquid crystals can have birefringence high enough, and, consequently, bandwidth broad enough, to transmit the entire visible spectrum. One class of materials which has demonstrated these high birefringence characteristics is derived from cyanotolane and (S)-(–)-(1)-phenylethanol. Thus, a single broadband/high birefringence liquid crystal film or a combination of films could polarize and transmit all visible wavelengths of light.

FIG. 5 illustrates the conventional, prior art monomeric liquid crystal apparatus 40. Since monomeric liquid crystals 42 are relatively low viscosity liquids, a monomer liquid crystal 42 needs to be fully captured by a cell consisting of two glass substrate layers 44 sandwiching the monomer liquid crystal 42 and a perimeter seal 46 which prevents leaking of the monomer liquid crystal 42.

FIG. 6, including FIGS. 6A and 6B, illustrates the preferred embodiment of the invention taught herein, in particular as to the structure of a rear polarizer 50. In FIG. 6A, the polymer liquid crystal 52 is initially formed into a film of desired thickness by two glass substrates 54, 56, respectively. Once formed, one of the glass substrates 56 can be removed, as in FIG. 6B leaving a polymer film 58 supported by the remaining glass substrate 56.

Figure 7:
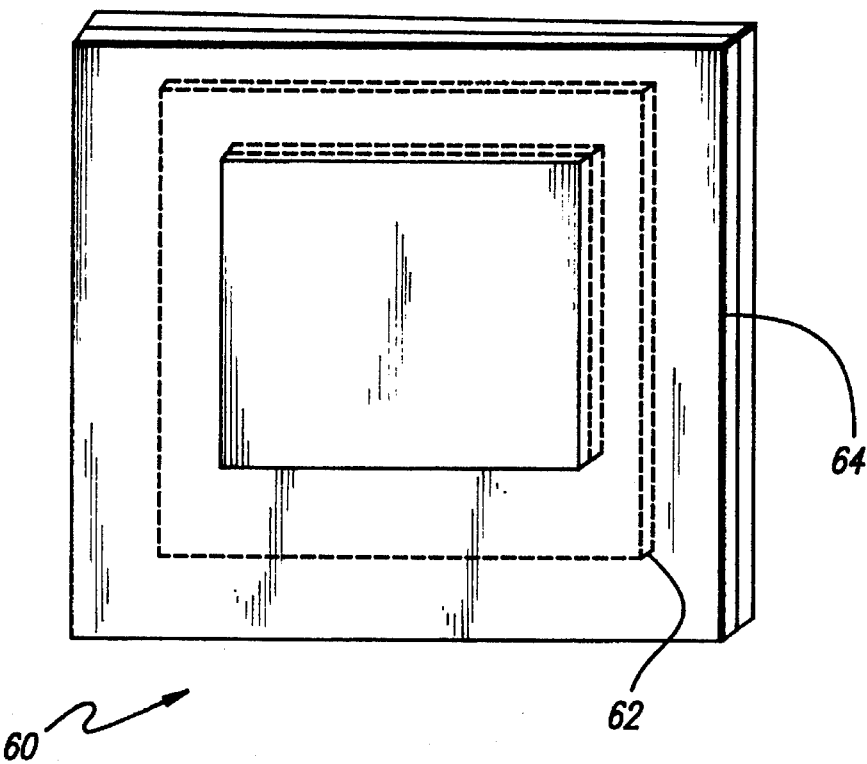
FIG. 7 shows a freestanding polymer chiral nematic liquid crystal film suspended in a partial frame.

FIG. 7 demonstrates the possible assemblage 60 of a single freestanding polymer film 62 in a supporting framework 64. The concept of photographic film in the form of slides, i.e. film supported by the surrounding cardboard border frame, is useful to conceptualize the arrangement. The commercial feasibility of a rear polarizer consisting of a freestanding broadband polymer chiral nematic LC film depends on other design parameters, but can be assembled to function as taught herein.

Figure 8:
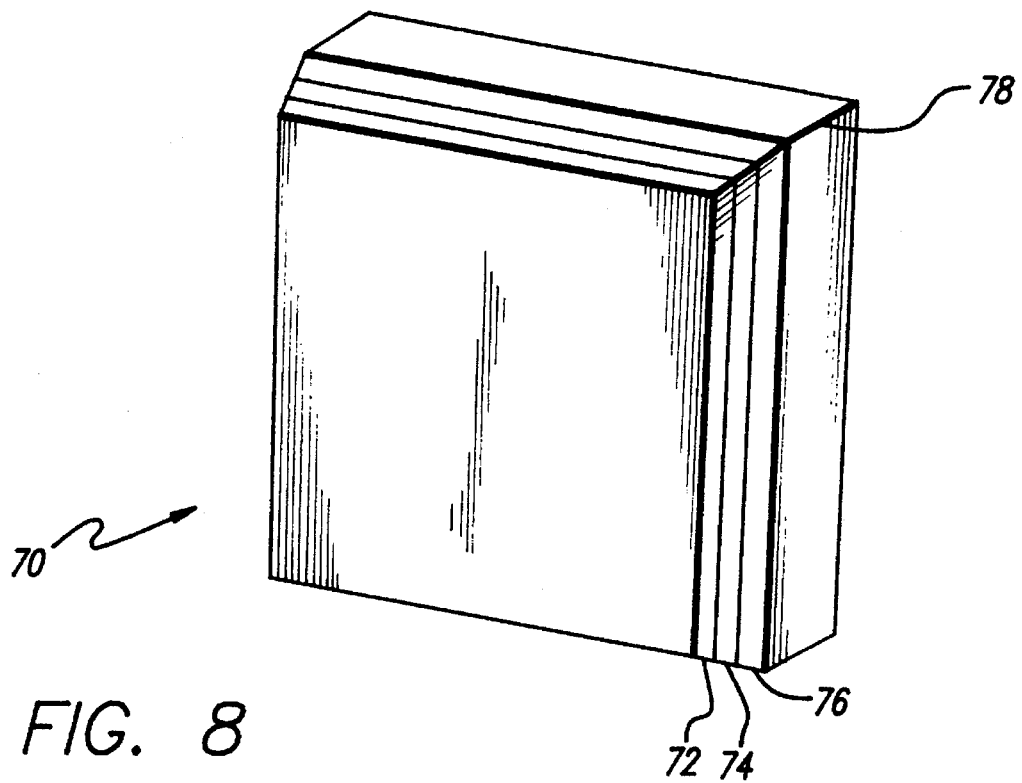
FIG. 8 depicts a multifilm polymer chiral nematic liquid crystal polarizer with single glass supporting layer.

FIG. 8 illustrates yet another configuration 70: multiple film layers 72, 74, 76 each of respectively different, moderate birefringence materials can be fused in order to achieve full spectrum transmission and a single glass substrate 78 can provide support as previously shown in FIG. 4.

While multifilm polymer chiral nematic LC polarizers can be freestanding, in light of present technological constraints, it is advisable to retain at least one glass support substrate. In the case of multifilm polymer chiral nematic LCs, the elimination of pairs of glass plates and the edging which form the cells required for containing monomeric polarizers, results in a tremendous reduction in bulk. In portable (battery-operated) equipment, the weight savings can then be further increased by reducing the size of the battery, since the power draw is lessened by the increased transmission efficiency. Alternatively, the power savings can be translated into longer battery time.

Thus, there has been shown and described a novel polarizer for a liquid crystal display. By using a polymer chiral nematic liquid crystal with high birefringence, one gets a broadband polarizer which transmits light without loss. Light outside the bandwidth is transmitted without polarization. Light within the bandwidth is transmitted as circularly polarized light, with virtually no absorption.

A circular to linear polarizer (such as a quarter wave plate) applies the linearly polarized light within the selected bandwidth to the LCD, which can selectively transmit or block that component in conjunction with a front polarizer. Other modifications and variations will occur to those skilled in the art. Accordingly, the breadth of the invention should be limited only by the scope of the claims appended hereto.

What is claimed is:

1. An assembly for a direct view apparatus comprising:
   a light source;
   circularly polarizing means in the optical path in a first, forward direction, said circularly polarizing means including a polymer chiral nematic liquid crystal, said polymer chiral nematic liquid crystal having a notch polarization bandwidth sufficient to allow transmission of circularly polarized light within a 100 nm to 250 nm band selected from the range of visible light;
   rear reflecting means adjacent said light source in a second, rearward direction;
   converting means for converting circularly polarized radiation to linearly polarized radiation directly adjacent said circular polarizing means;
   display means directly adjacent said converting means for converting linearly polarized light to a direct view display; and
   polarization means directly adjacent said display means for absorbing radiation not contributing to the direct view display image.

2. The assembly of claim 1, wherein said polymer chiral nematic liquid crystal comprises combinations of chiral and nematic liquid crystal monomers attached to backbones selected from the methacrylate/acrylate class of polymers.

3. The assembly of claim 2, wherein said circular polarizing means includes a polymer chiral nematic liquid crystal configured as a film supported on at least one side by a transparent substrate.

4. The assembly of claim 3, wherein said polymer chiral nematic liquid crystal is supported on both sides by transparent substrates.

5. The assembly of claim 4, wherein said rear reflecting means includes a material which reverses the "sense" (handedness) of circular polarization of some portion of impinging light reflected from said circular polarizing means and which reflects to said circular polarizing means light from said light source which initially traveled in a direction away from said circular polarizing means.

6. The assembly of claim 5, wherein said rear reflecting means includes a metallic element.

7. The assembly of claim 6, wherein said polymer chiral nematic liquid crystal film is designed with birefringence and notch bandwidth sufficient to circularly polarize and transmit the entire visible light spectrum.

8. In an assembly for illuminating a direct view apparatus including a light source, a liquid crystal device (LCD), and a front polarizer, an improved rear polarizer comprising:
   circularly polarizing means for polarizing applied radiation within a selected bandwidth in a first preferred direction and for reflecting radiation within the selected bandwidth polarized in a second direction interposed in the optical path between the light source and the liquid crystal device in a first, forward direction, said circularly polarizing means including a polymer chiral nematic liquid crystal, said polymer chiral nematic liquid crystal having a notch polarization bandwidth sufficient to allow transmission of circularly polarized light within a 100 nm to 250 nm band selected from the range of visible light;
   reflecting means for returning to said circularly polarizing means radiation reflected from said circularly polarizing means and radiation directly received from the light source adjacent the light source in a second, rearward direction, said reflecting means including a reflecting material which reverses the direction of circularly polarization of a portion of the impinging light that is reflected from said circular polarizing means and which reflects rearward directed light from the light source, said reflective material including a metallic element; and
   converting means for converting circularly polarized light to linearly polarized light between said circularly polarizing means and said liquid crystal device, whereby substantially all radiation from the light source within the selected bandwidth is ultimately converted by the front polarizer to linearly polarized light which displays the liquid crystal device display image.

9. The assembly of claim 8, wherein said polymer chiral nematic liquid crystal comprises combinations of chiral and monomer liquid crystal attached to backbones selected from the methacrylate/acrylate class of polymers.

10. The assembly of claim 8, wherein said polymer chiral nematic liquid crystal is configured as a film supported on at least one side by a transparent substrate.

11. The assembly of claim 8, wherein said polymer chiral nematic liquid crystal is supported on both sides by transparent substrates.

12. In an assembly for illuminating a direct view apparatus including a light source, a liquid crystal device (LCD), and a front polarizer, an improved rear polarizer comprising:
   circularly polarizing means for polarizing applied radiation within a selected bandwidth in a first preferred direction and for reflecting radiation within the selected bandwidth polarized in a second direction interposed in the optical path between the light source and the liquid crystal device in a first, forward direction, said circularly polarizing means comprising a plurality of chiral nematic liquid crystal films which, in combination, have an effective notch polarization bandwidth sufficient to allow transmission of circularly polarized light within a 100 nm to 250 nm band selected from the range of visible light;
   reflecting means for returning to said circularly polarizing means radiation reflected from said circularly polarizing means and radiation directly received from the light source adjacent the light source in a second, rearward direction; and
   converting means for converting circularly polarized light to linearly polarized light between said circularly polarizing means and said liquid crystal device, whereby substantially all radiation from the light source within the selected bandwidth is ultimately converted by the front polarizer to linearly polarized light which displays the liquid crystal device display image.

13. The assembly of claim 12, wherein said polymer chiral nematic liquid crystal of said films comprises combinations of chiral and monomer liquid crystal attached to backbones selected from the methacrylate/acrylate class of polymers.

14. In an assembly for illuminating a direct view apparatus including a light source, a liquid crystal device (LCD), and a front polarizer, an improved rear polarizer comprising:

circular polarizing means for polarizing applied radiation within a selected bandwidth in a first preferred direction and for reflecting radiation within the selected bandwidth polarized in a second direction interposed in the optical path between the light source and the liquid crystal device in a first, forward direction said circular polarizing means being a polymer chiral nematic liquid crystal, said polymer chiral nematic liquid crystal film being designed with birefringence and notch bandwidth sufficient to circularly polarize and transmit the entire visible light spectrum;

reflecting means for returning to said circular polarizing means radiation reflected from said circular polarizing means and radiation directly received from the light source adjacent the light source in a second, rearward direction; and converting means for converting circularly polarized light to linearly polarized light between said circular polarizing means and said liquid crystal device, whereby substantially all radiation from the light source within the selected bandwidth is ultimately converted by the front polarizer to linearly polarized light which displays the liquid crystal device display image.

* * * * *